United States Patent
Breß et al.

(10) Patent No.: US 12,050,603 B2
(45) Date of Patent: *Jul. 30, 2024

(54) OPPORTUNISTIC CLOUD DATA PLATFORM PIPELINE SCHEDULER

(71) Applicant: Snowflake Inc., Bozeman, MT (US)

(72) Inventors: Sebastian Breß, Berlin (DE); Moritz Eyssen, Berlin (DE); Max Heimel, Berlin (DE); Max Jendruk, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,010

(22) Filed: Feb. 28, 2023

(65) Prior Publication Data

US 2023/0205770 A1 Jun. 29, 2023

Related U.S. Application Data

(63) Continuation of application No. 17/515,232, filed on Oct. 29, 2021, now Pat. No. 11,615,092.

(51) Int. Cl.
*G06F 16/2453* (2019.01)
*G06F 9/48* (2006.01)
*G06F 16/27* (2019.01)

(52) U.S. Cl.
CPC ...... *G06F 16/24542* (2019.01); *G06F 9/4881* (2013.01); *G06F 16/24532* (2019.01); *G06F 16/27* (2019.01)

(58) Field of Classification Search
CPC .. G06F 16/2454; G06F 16/27; G06F 16/2453; G06F 9/4881
USPC ......................................................... 707/718
See application file for complete search history.

(56) References Cited

U.S. PATENT DOCUMENTS

| 7,577,667 B2 | 8/2009 | Hinshaw et al. |
| 7,702,610 B2 | 4/2010 | Zane et al. |
| 8,244,718 B2 | 8/2012 | Chamdani et al. |

(Continued)

OTHER PUBLICATIONS

"U.S. Appl. No. 17/515,232, Final Office Action mailed Aug. 11, 2022", 16 pgs.

(Continued)

*Primary Examiner* — Robert W Beausoliel, Jr.
*Assistant Examiner* — Lauren Zannah Ganger
(74) *Attorney, Agent, or Firm* — Schwegman Lundberg & Woessner, P.A.

(57) ABSTRACT

Methods, systems, and computer programs are presented for scheduling and executing request plans using an opportunistic approach. An opportunistic scheduler generates a request plan for a request on a cloud data platform, the request plan comprising a plurality of operations and identifies a plurality of contingent operations from the plurality of operations of the request plan. The opportunistic scheduler schedules the plurality of contingent operations for execution and sets the scheduled plurality of contingent operations to execute at a specific position in the request plan. The opportunistic scheduler sets remaining operations for execution by any available thread as threads that are processing the request plan become available and processes the request plan according to the scheduled plurality of contingent operations.

20 Claims, 10 Drawing Sheets

(56) References Cited

U.S. PATENT DOCUMENTS

| | | | |
|---|---|---|---|
| 11,615,092 B1* | 3/2023 | Breß | G06F 16/27 707/718 |
| 2017/0039239 A1 | 2/2017 | Saadat-panah et al. | |
| 2017/0293626 A1* | 10/2017 | Dageville | G06F 16/162 |
| 2020/0379998 A1 | 12/2020 | Dixit et al. | |

OTHER PUBLICATIONS

"U.S. Appl. No. 17/515,232, Non Final Office Action mailed Mar. 18, 2022", 16 pgs.
"U.S. Appl. No. 17/515,232, Notice of Allowance mailed Dec. 1, 2022", 6 pgs.
"U.S. Appl. No. 17/515,232, Response filed Jun. 21, 2022 to Non Final Office Action mailed Mar. 18, 2022".
"U.S. Appl. No. 17/515,232, Response filed Nov. 9, 2022 to Final Office Action mailed Aug. 11, 2022", 13 pgs.

* cited by examiner

OPPORTUNISTIC CLOUD DATA PLATFORM PIPELINE SCHEDULER

CROSS-REFERENCE TO RELATED APPLICATION

This application is a Continuation of U.S. patent application Ser. No. 17/515,232, filed Oct. 29, 2021, the contents of which are incorporated by reference in their entirety.

TECHNICAL FIELD

Embodiments of the disclosure relate generally to a network-based database system or a cloud data platform and, more specifically, to implementing database operations of a query on a database.

BACKGROUND

A query against data on a database can comprise a plurality of operations that are performed in sequence or concurrently to process data according to the query. It can be difficult to schedule the operations for execution on the database in a way that yields the correct results with little delay in processing, while avoiding inefficient use of database computational resources, such as processors and memory.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
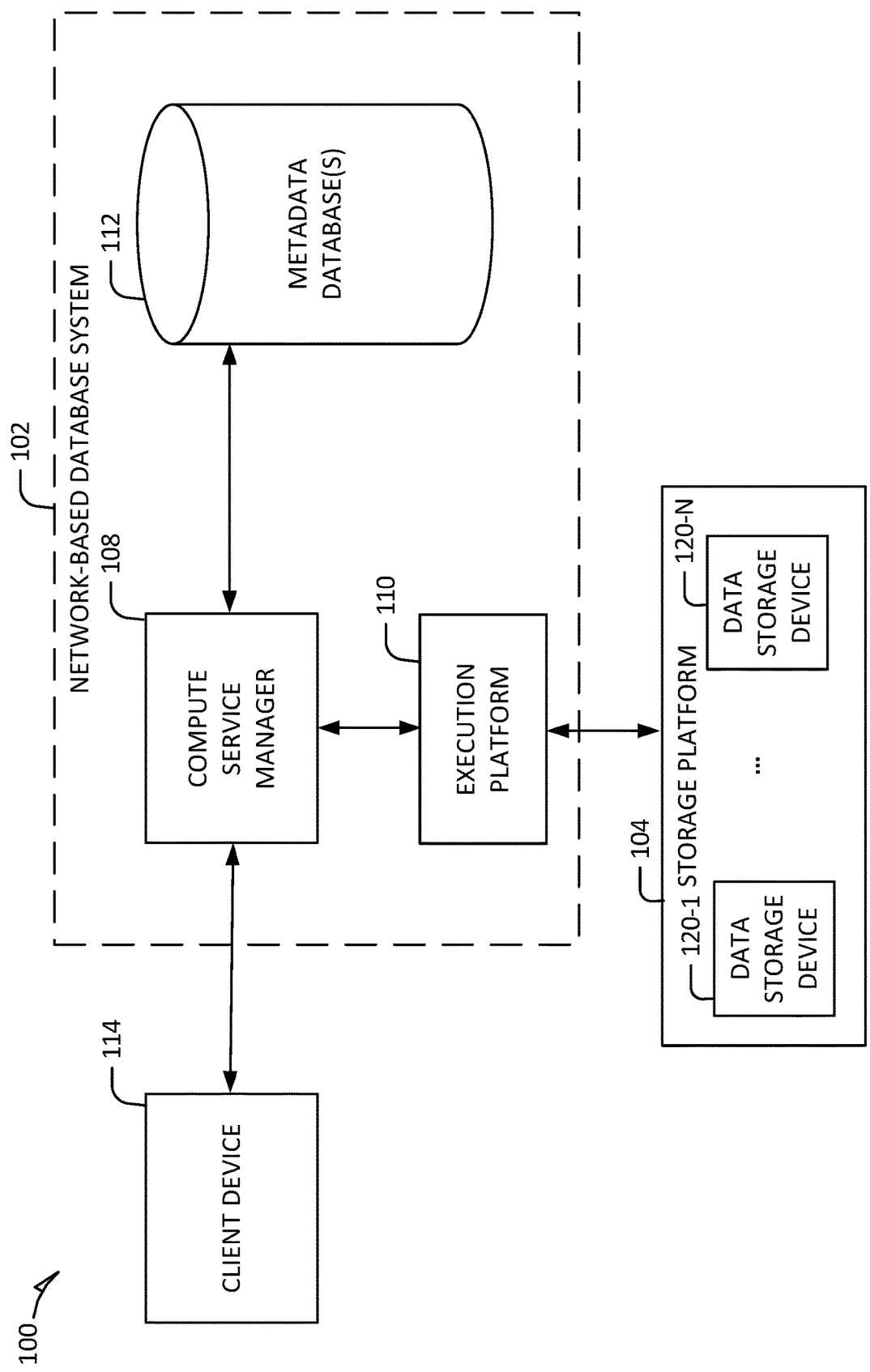
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A distributed database can comprise a plurality of execution nodes on which query operations of a query are performed. An execution node's operator scheduler is configured to select which operators (or operator pipelines) should be evaluated in which order for a received query plan. The scheduler synchronizes the distributed execution of these operators across all worker processes and ensures that operators are finalized in a deterministic manner to ensure correct output data and results. A pipeline is a sequence of connected row set operators (RSOs) that start and end with one or more leaf operators, end in a pipeline breaker, or end in a result operator, as discussed in further detail below.

In one approach, the scheduler implements a strict lockstep protocol, in which all worker processes operate on the same pipeline at the same time and are all actively terminated by a master worker before starting the next pipeline. This approach performs well in scenarios where vast amounts of data is processed by comparatively few operators, and where there is little skew between the threads/processes that work on a pipeline. However, if a query plan, or parts of it, process comparatively little data, the rigidity of the lockstep scheduler can slow processing down significantly. In particular, the lockstep scheduler implementation often leads to threads/processes idling while waiting for others to finish the current "step". This makes it harder to meet query response time Service Level Agreements (SLAs) and lowers the cost competitiveness of the database system.

To address the foregoing issues, among others, an opportunistic scheduler of an execution node can be implemented such that operator scheduling overhead is reduced and resource utilization in an execution node is increased by enabling inter-pipeline parallelism. In some example embodiments, strict lockstep scheduling is performed only in certain circumstances, such as for leaf operators and for operators with dependencies. In this way, query plans that implement many operators, but process relatively little data, are significantly sped up.

In previous approaches, if a query plan or part of a query plan fails, the entire query is recomputed from the start, which can cause delay and significant overhead. In some example embodiments, the opportunistic scheduler further implements operator restarting to efficiently recompute fragments of a query plan.

In previous approaches, the scheduler for an execution node schedules a single pipeline globally, waits for all threads globally to finish processing (e.g., leaves a number of threads sitting idle for a time), and then progresses to the next operator. In contrast, and in accordance with some example embodiments, the opportunistic scheduler schedules a next or subsequent operator immediately, once the thread (or process) has finished processing the current operator. In this way, the resource utilization is increased, particularly in those database instances in which "jig-saw"-like patterns in the CPU utilization graph have been observed (e.g., skew, idling amongst some threads that are waiting while others are still processing in the lockstep approach).

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104 of the cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service manager 108, metadata database(s) 112, execution platform 110, and cloud storage platform 104 may be implemented as a distributed system (e.g., distributed across multiple systems/platforms at multiple geographic locations). Additionally, each of the compute service manager 108, metadata database(s) 112, execution platform 110, and cloud storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
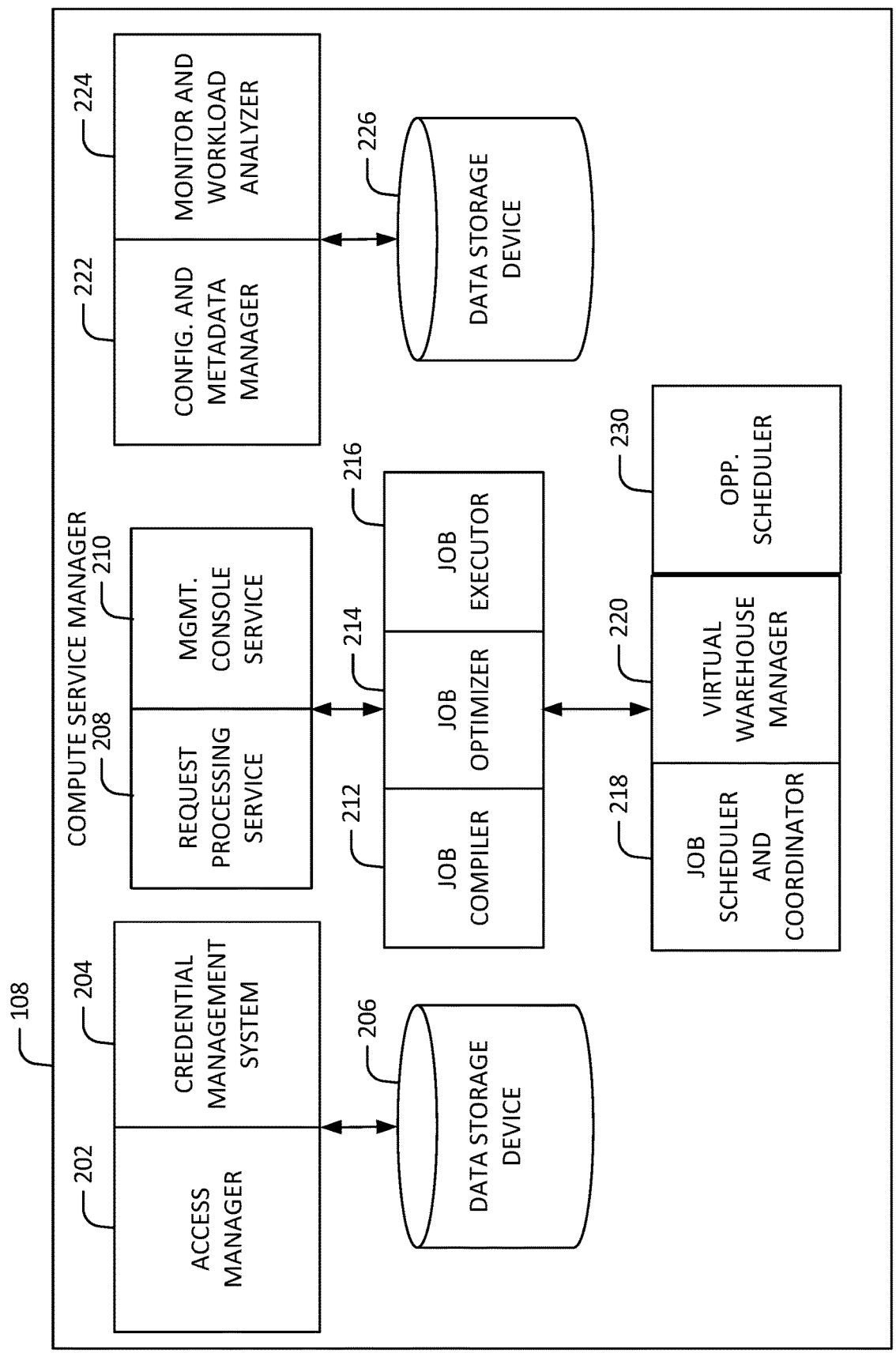
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to a data storage device 206 (e.g., an access metadata database), which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects in the data storage device 206. A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The opportunistic scheduler 230 is configured to manage scheduling of database operators for queries (e.g., in a query plan). Although in FIG. 2 the opportunistic scheduler 230 is illustrated in the compute service manager 108, in some example embodiments instances of the opportunistic scheduler 230 are implemented in each of the execution nodes (XP nodes, FIG. 3). In some example embodiments, the job scheduler and coordinator 218 implements a lockstep scheduler architecture, and the opportunistic scheduler 230 implements a lightweight efficient scheduling architecture, as discussed in further detail below.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
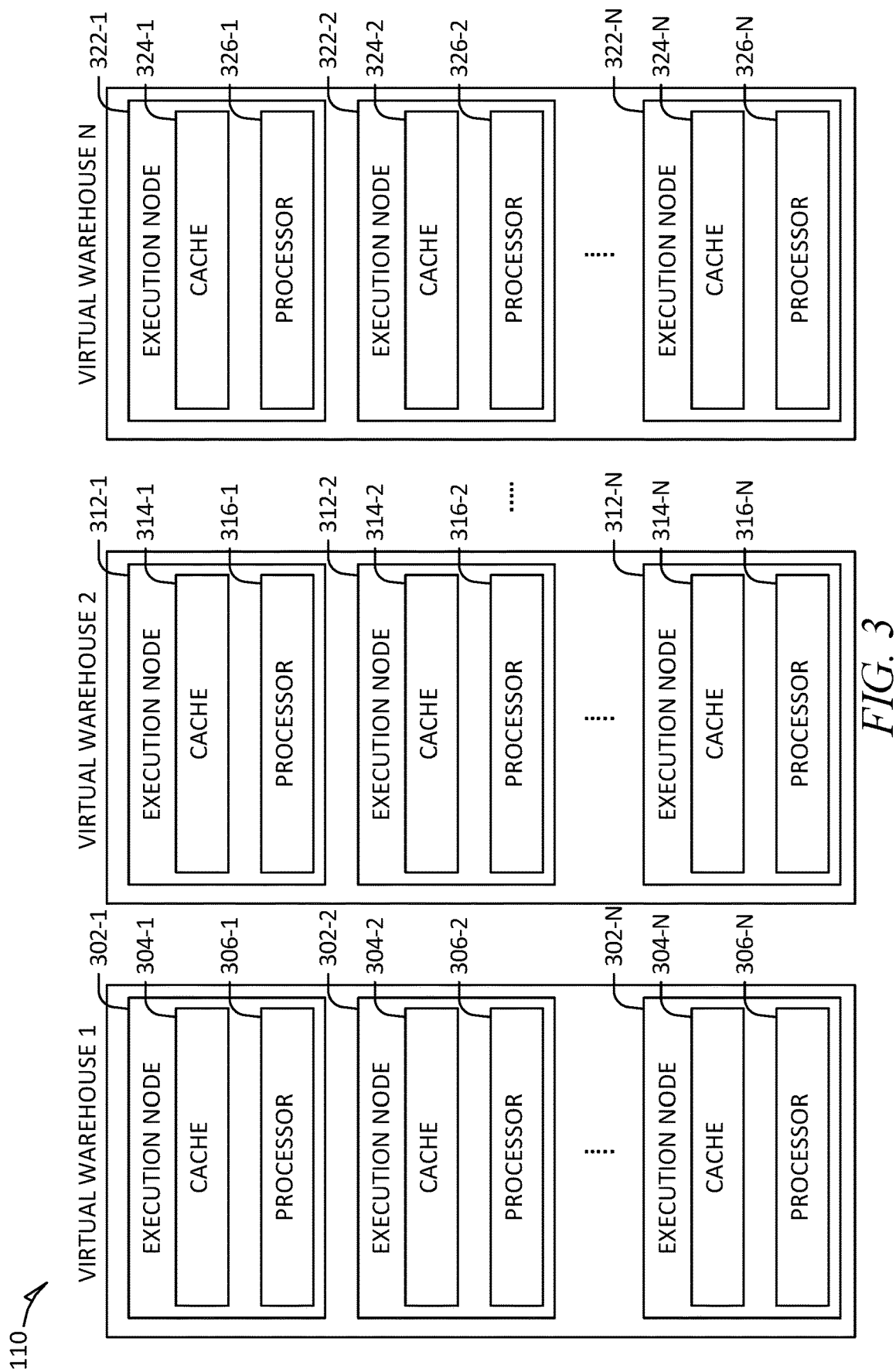
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
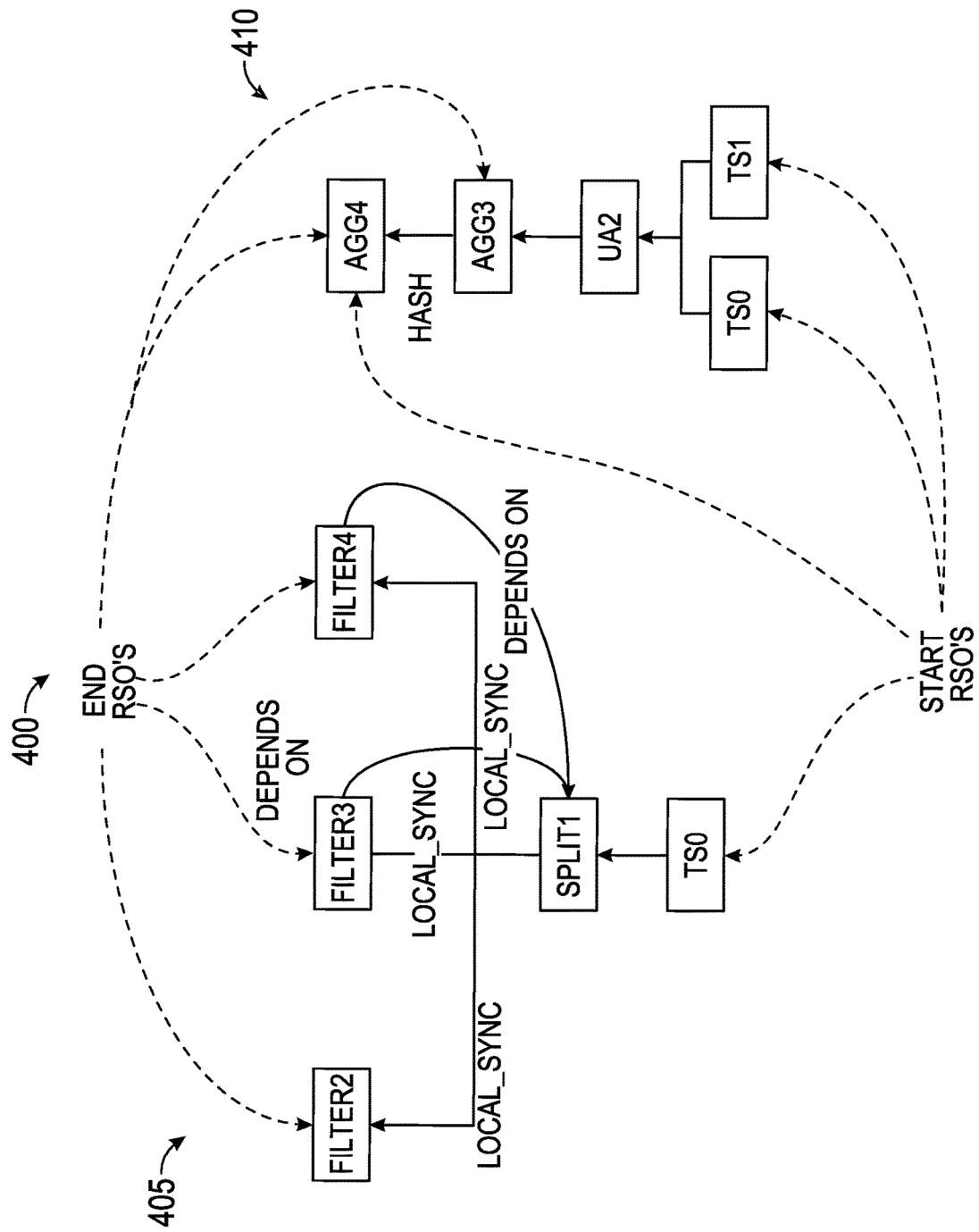
FIG. 4 shows example scheduling on a database, in accordance with some embodiments of the present disclosure.

FIG. 4 shows example scheduling in a directed acyclic graph (DAG) 400 that models relationships of RSOs that are implemented to process query fragments, in accordance with some example embodiments. In the illustrated example, the DAG 400 comprises a query fragment 405 and query fragment 410 (e.g., fragments that can be implemented in a single query, or can be fragments from different queries). The fragment 405 and the fragment 410 each have start leaf nodes (e.g., table scans, TS0, TS1), followed by other operators (e.g., splits, filters, aggregations, union all (UA2)), and end various end nodes (e.g., filters, aggregations), as an example. As mentioned above, the pipeline is a sequence of connected RSOs that starts and ends with one or more leaf operators (e.g., TableScan, ExternalScan, RowGenerator, EPScan), ends a pipeline breaker (e.g., Buffer, Parent Aggregation, Sort, PartitionOrderBy), or ends in a result operator. SOs in a pipeline can be connected via all link types, including redistributing links. In some example embodiments, in the life cycle of an database operator such as a row set operator (RSO), the RSO is activated, performs processing, and remains active (e.g., utilizing assigned computational resources, threads, memory) until terminated (e.g., by a TERMINATE message from the Query Coordinator, or the local Control Worker in which the RSO operates). Further, although in FIG. 5 the end RSOs are illustrated at ending points of the fragment 405 and 420, it is appreciated that the end RSOs may be ends only for the given query fragment (e.g., the fragment 405 is in a given query and other fragments of the given query are processed after the end RSOs of the fragment 405 in FIG. 4). Further, the end RSOs may also correspond to actual ends of a given query (e.g., the end RSOs are the end or last processes of a query), in accordance with some example embodiments.

Figure 5:
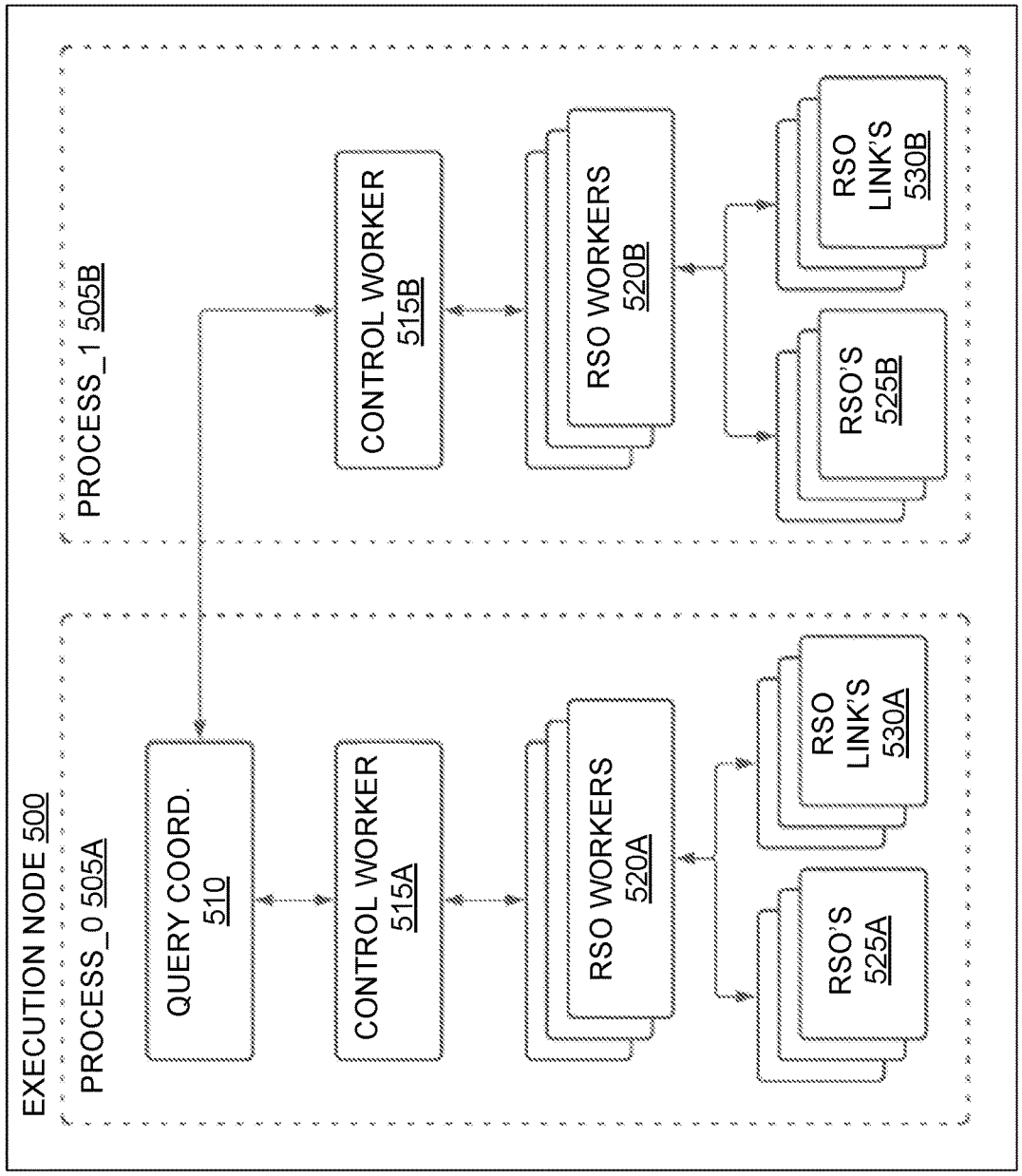
FIG. 5 shows an execution node, in accordance with some embodiments of the present disclosure.

FIG. 5 shows an example execution node 500 (e.g., execution node 302-1) implementing opportunistic scheduler architecture (e.g., instances of the opportunistic scheduler 230), according to some example embodiments. As used here, "global" means "regarding the entire ProcessGroup" (e.g., Process_0 505A, Process_1 505B), and further "local" means "regarding all threads in a process" (e.g., a plurality of threads in Process_0 505A, another plurality of threads in Process_1 505B). Further, a row set operator (RSO) is a data processing operator that performs a defined task (e.g., table scan, filter, aggregation). Further details of set operators are discussed in U.S. Pat. No. 10,671,605, which is hereby incorporated in its entirety. Further, an operator link (e.g., an RSO link) is a data broker that directs data from an input RSO to an output RSO. A query plan is formed in response to a query (e.g., query received from a database user) to complete the specified operations.

The query coordinator 510 is the main worker coordinating the scheduling of SOs and is only running on the primary process (e.g., process0). In some example embodiments, the query coordinator 510 provides the list of SOs (representing pipelines) that are "ready" to be activated, e.g., those SOs whose dependencies have been fulfilled. Further, in accordance with some example embodiments, the execution node 500 is notified about the completion of SOs and updates this "ready" list of RSO accordingly, thereby tracking which operators can be activated next as the result of completions. The query coordinator 510 is the global authority over explicitly scheduling pipelines/RSOs in the execution node 500.

A Control Worker (e.g., control worker 515A, control worker 515B) runs on each process, including the primary process. The control worker is responsible for the actual explicit scheduling of synchronous RSO chains in that particular process. The control worker receives information about which operators are ready to be scheduled from the query coordinator.

The RSO Worker (e.g., RSO Workers 520A, RSO Workers 520B) are threads that perform processing of the RSOs (e.g., RSO'S 525A, RSO'S 525B) and the operator links (e.g., RSO Links 530A, RSO Links 530B).

Figure 6:
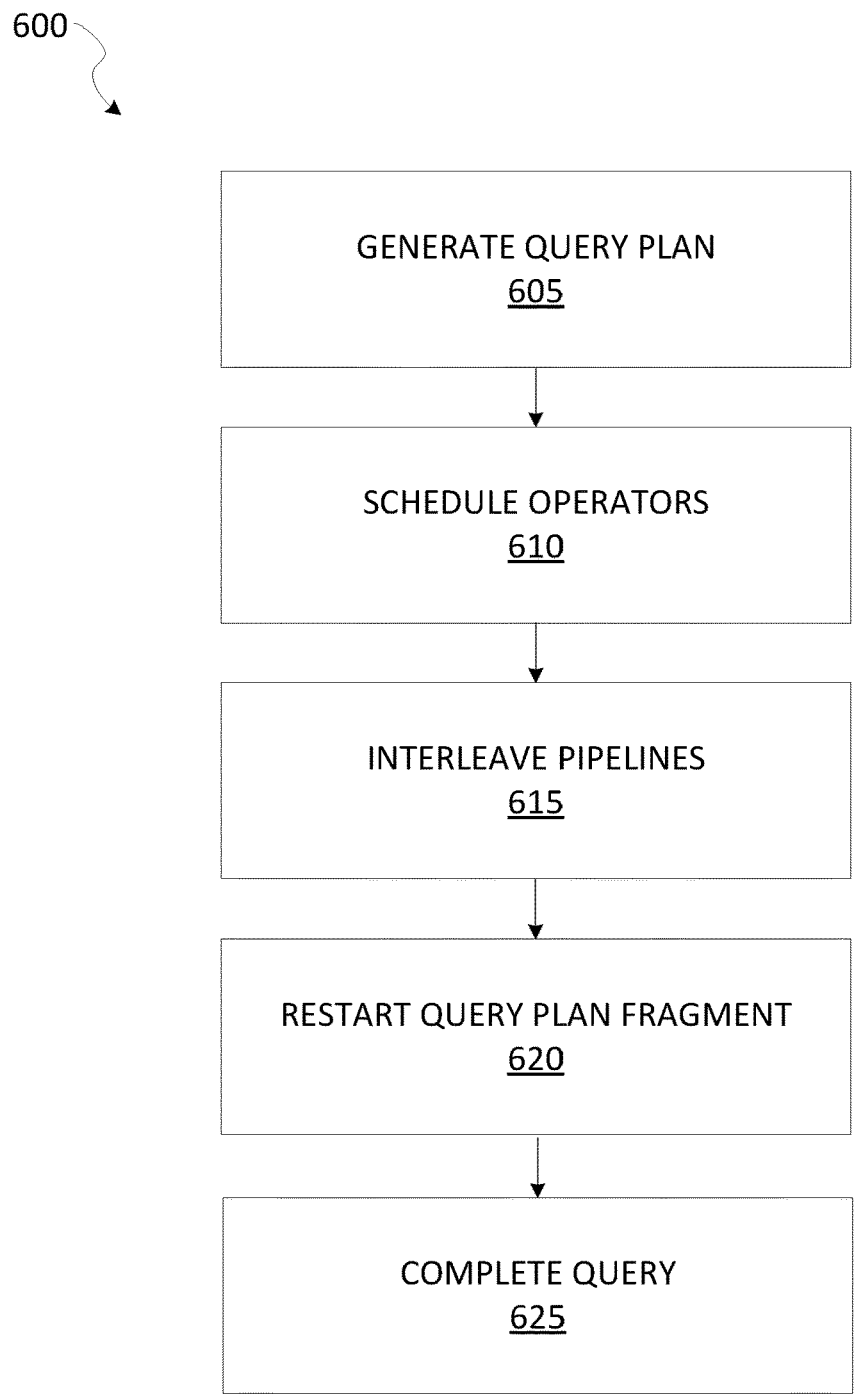
FIG. 6 shows a flow diagram of a method for implementing opportunistic scheduling in an execution node, in accordance with some embodiments of the present disclosure.

FIG. 6 shows a flow diagram of a method 600 for implementing opportunistic scheduling in an execution node, in accordance with some example embodiments. At operation 605, a query plan is generated. For example, an end-user that is operating a client device 114 submits a query to the network-based database system 102, which receives the query and generates a query plan to process the query.

At operation 610, the opportunistic scheduler 230 performs scheduling only for contingent database operations. The opportunistic scheduler 230 is configured to identify contingent database operations in a query plan. For example, identify leaf operators as those operators that start or end an RSO sequence, and identify dependent operators are dependent (e.g., identify a probe-side leaf RSO of a join operation that depends on the build side RSOs), or otherwise determined to be dependent by the opportunistic scheduler 230 (e.g., IF/THEN rules that specify orderings of RSOs that indicate that one or more of the RSOs are dependent). In some example embodiments, the contingent database operations include those operators that function based on their position in the sequence of RSOs in a given pipeline, such as leaf RSOs and dependent RSOs.

The leaf RSOs are operators that start or end a pipeline and are scheduled explicitly by the opportunistic scheduler, in accordance with some example embodiments. For example, the start leaf RSOs do not receive input data by which the start leaf RSOs could be triggered (e.g., TableScans, RowGenerators or ValueSets) and are thus position dependent in the sequence of RSOs. As an example, the table scans (e.g., TS0, TS1) are explicitly scheduled as the table scans collect or scan a table to gather data from the tables as requested by a given query.

In some example embodiments, a dependent RSO is an operator that depends on another RSO to complete its operations first so that the dependent RSO can run. For example, when RSO_A depends on RSO_B, then RSO_A will only be initiated once processing of RSO_B has been completed. As used here, "completed" means that RSO_B must have been terminated and all consumer RSOs of RSO_B must have received all data produced by RSO_B.

Figure 7A:
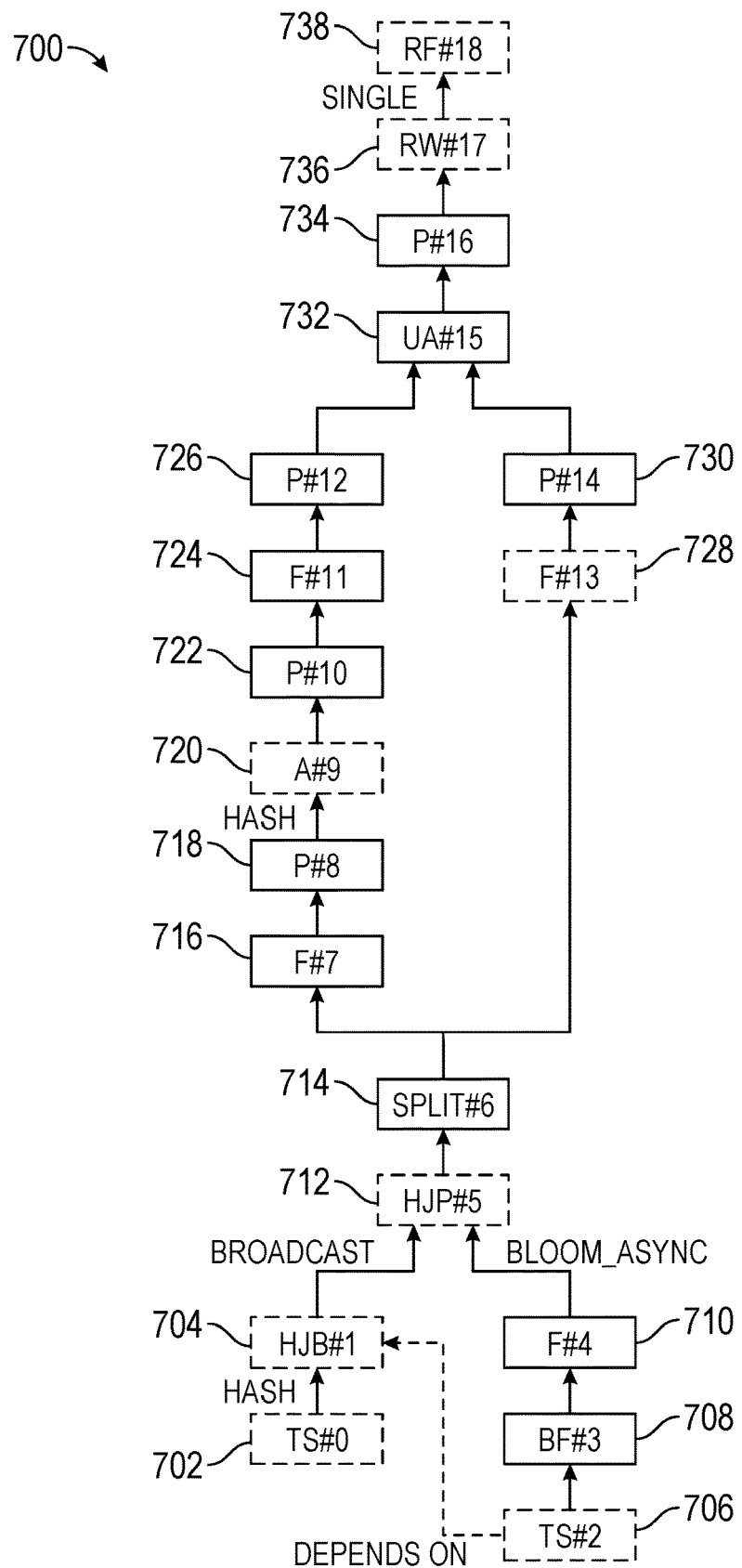
FIGS. 7A and 7B show example scheduling of a query on a database, in accordance with some embodiments of the present disclosure.
Figure 7B:
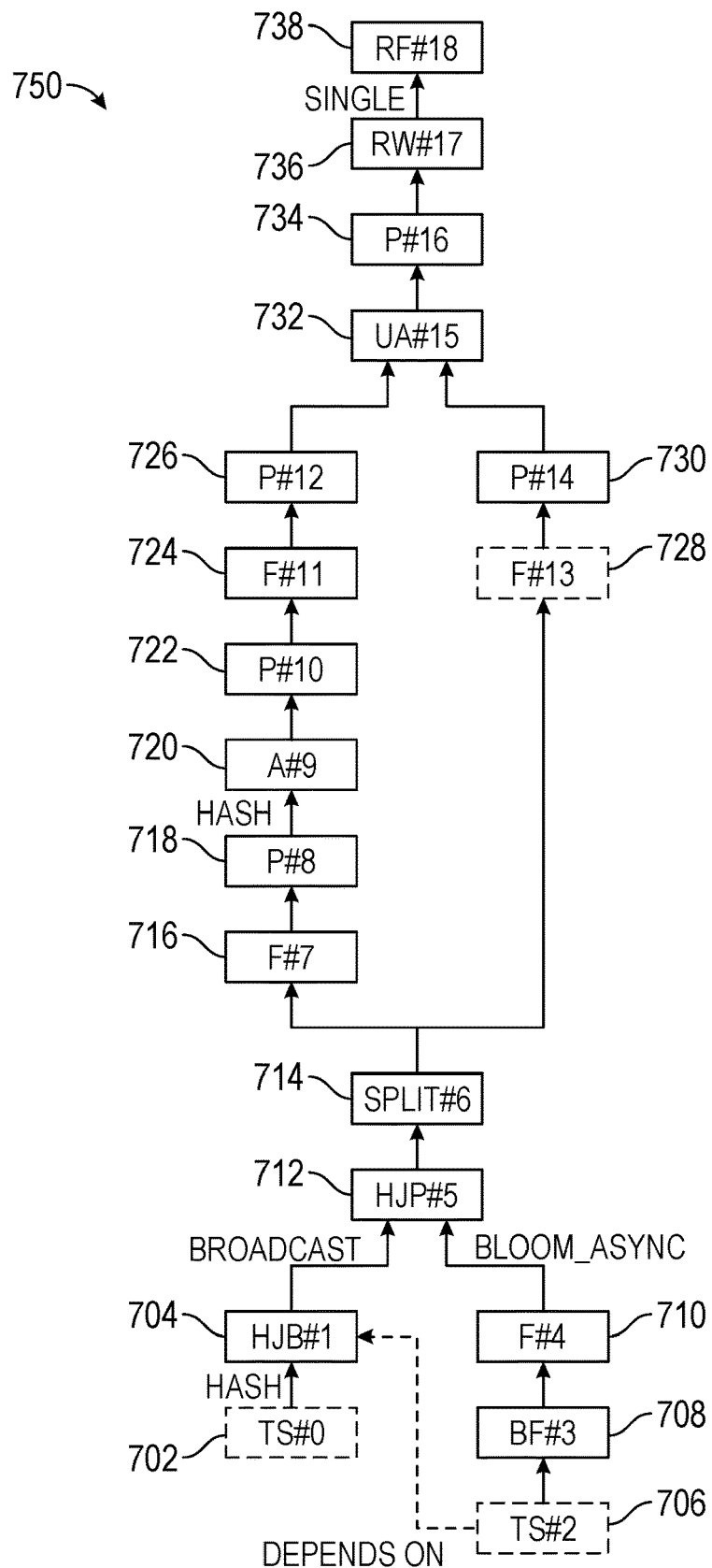

FIG. 7A and FIG. 7B show example contingent scheduling, as an example. In the example of FIGS. 7A and 7B, the query plan is a LEFT OUTER JOIN query of two tables. In FIG. 7A, the query plan 700 comprises a plurality of operators 702, 704, 706, 708, 710, 712, 714, 716, 718, 720, 722, 724, 726, 728, 730, 732, 734, 736, and 738. In the lockstep approach, increased explicit scheduling for the operators is implemented to create numerous sync points. For example, in FIG. 7A the operators 702, 704, 706, 712, 720, 728, 736, and 738 are explicitly scheduled (denoted by dotted line border), which may cause threads to idle if a relatively small amount of data is processed by the query plan and operators finish early and must wait at the synch points of the explicitly scheduled operators to continue.

FIG. 7B shows an example query plan 750 generated at operation 605 and scheduled at operation 610 of method 600. As mentioned, the query plan 750 is the same LEFT OUTER JOIN query of two tables shown in FIG. 7A. In contrast, by only scheduling contingent database operators, including leaf operators (e.g., operators 702 and 706) and dependent operators (e.g., operator 728), far fewer of the operators in the query plan 750 are explicitly scheduled (e.g., 702, 706, 728), thereby lessening the overhead and idling of the threads that finish their RSOs early, and enabling faster processing by interleaving pipelines and restarting portions of the query, as discussed below.

At operation 615, the RSO pipelines are interleaved. Interleaved scheduling enables multiple pipelines to be active within the process group at the same time (e.g., Process0, Process_1, Process_2, within a given execution node), which can increase resource utilization. As an example, instead of waiting for the query coordinator 510 to schedule the next pipeline, the RSO Workers (e.g., 520A, 520B) running the start RSOs of pipelines can advance to the next pipeline-starting RSO that is ready to be scheduled as soon as they are done with their current one. This can be especially useful in situations where there are "stragglers" in the process group that cause many others to wait for them.

Unconditionally applied, interleaved scheduling can lead to overutilization of resources—in particular memory. For example, one or more threads may move onto the next ready RSO or RSO chain, which may be complex and memory intensive.

In some example embodiments, to avoid overutilization of resources from interleaving, interleaved scheduling is restricted to a limited number of additional RSO, for example by setting a limit to not schedule more than two or three pipelines at the same time. In this way, the nodes can make progress by handling new interleaved pipelines while other nodes are straggling, without allowing the advancing individual nodes to "race ahead" too far in terms of scheduling. In some example embodiments, instead of using a fixed number for the maximum number of pipelines, each pipeline is assigned based on its estimated resource or memory cost, and the limit is set using a maximum weight of pipelines that can be scheduled at the same time based on the current resource consumption and available resources (e.g., available memory) on the execution node.

In some example embodiments, to avoid overutilization of resources (e.g., memory) from the pipeline interleaving, some ready pipelines are advanced to the front of the queue. For example, older pipelines can be prioritized and moved to the front of the queue. In some example embodiments, to avoid overutilization of resources from interleaving, a limit is set for the maximum number of pipelines that are executed in parallel.

At operation 620, a query plan fragment is restarted. For example, one or more RSOs in a portion of a pipeline are restarted without restarting the entire plan. In contrast to previous approaches, in which a portion of a query fails (e.g., in online transaction processing, a transaction value is invalid or conflicts with another value) and where the entire query would be restarted to address the issue, the opportunistic scheduler can instead restart fragments of a query plan instead of the entire query, thereby drastically decreasing failure and restart-based delays (e.g., hundreds of milliseconds in the previous approaches, versus a single digit millisecond range faster opportunistic restarts).

In some example embodiments, an Online Transaction Processing (OLTP) transaction is restarted at operation 620, for example, where the query received at operation 605 is an OLTP transaction. In an OLTP configuration, the network-based database system 102 is configured to manage a large number of relatively small database transactions in such a way to maintain data integrity across the database as it is accessed by a multitude of queries of different users (e.g., avoid transactional conflicts) and emphasize very fast query processing, where the effectiveness is measured by number of transactions per second, according to some example embodiments. In some example embodiments, the OLTP database can be implemented as a key-value database in which the data is managed as key-value pairs (e.g., FoundationDB). The key-value store is a data storage approach designed for storing, retrieving, and managing associative arrays, and a data structure more commonly known today as a dictionary or hash table. The dictionaries contain a collection of objects that have many different fields within each object, where each contains data. The OLTP records are stored and retrieved using a key that uniquely identifies a given record, and is used to find the data within the OLTP database.

In some example embodiments, for OLTP-style queries, transaction management is managed by the execution node to speed up transaction conflict resolutions. In some example embodiments, an OLTP commit operator will raise an error and restart the query if any write conflict arose during the duration of the transaction. This avoids restarting the query using the compute service manager 108, which would restart the entire query). Instead, at operation 620, the commit operator requests that the operators below are rescheduled. In this way, since the restart is handled fully within the execution node, the restart is significantly more lightweight and faster than a restart triggered by the compute service manager 108. Although an OLTP transaction restart due to a violation is discussed here, as an example, restarts or rescheduling of RSOs can be implemented in other types of query plans, including Partitioned Execution and Holistic Join Broadcast (HJB) based query plans.

In partitioned execution, resource savings is achieved by partitioning the inputs of a join (or multiple joins) into sets such that only individual partitions need to be joined to produce results. In holistic join broadcast queries, HJBs belonging to a HJP pipeline are executed multiple times. Only the HJBs, but not the operators below them, are to be executed multiple times. In the first execution, build side row counts are determined. The second execution of the HJBs is to happen as soon as all HJBs of the HJP pipeline finish, but before the HJP pipeline itself starts and will compute a holistic broadcast decision, adjust link types and then broadcast/redistribute the rows.

In some example embodiments, restart limitations are implemented on the opportunistic scheduler to achieve accurate data results. In some example embodiments, only RSOs that are part of the explicit schedule according to the opportunistic scheduler can be restarted or otherwise rescheduled at operation 620.

In particular, for example, RSOs that are marked as reschedulable in the query plan, RSOs with dependencies, and RSOs that are added to the schedule based on their type (e.g., RSO Commit) can be rescheduled. Further, rescheduling via the opportunistic scheduler must occur before the last explicitly scheduled RSO is scheduled, because after the last explicitly scheduled RSO is scheduled, worker processes are free to disappear at any time, according to some example embodiments.

In some example embodiments, in restarting a set of SOs with dependencies, the dependencies are handled as follows: (1) dependencies between RSOs within the set are reset to their original state (2) dependencies from RSOs within the set to RSOs outside of the set are not reset and (3) dependencies from RSOs outside of the set onto RSOs within the set are an error condition.

Figure 8:
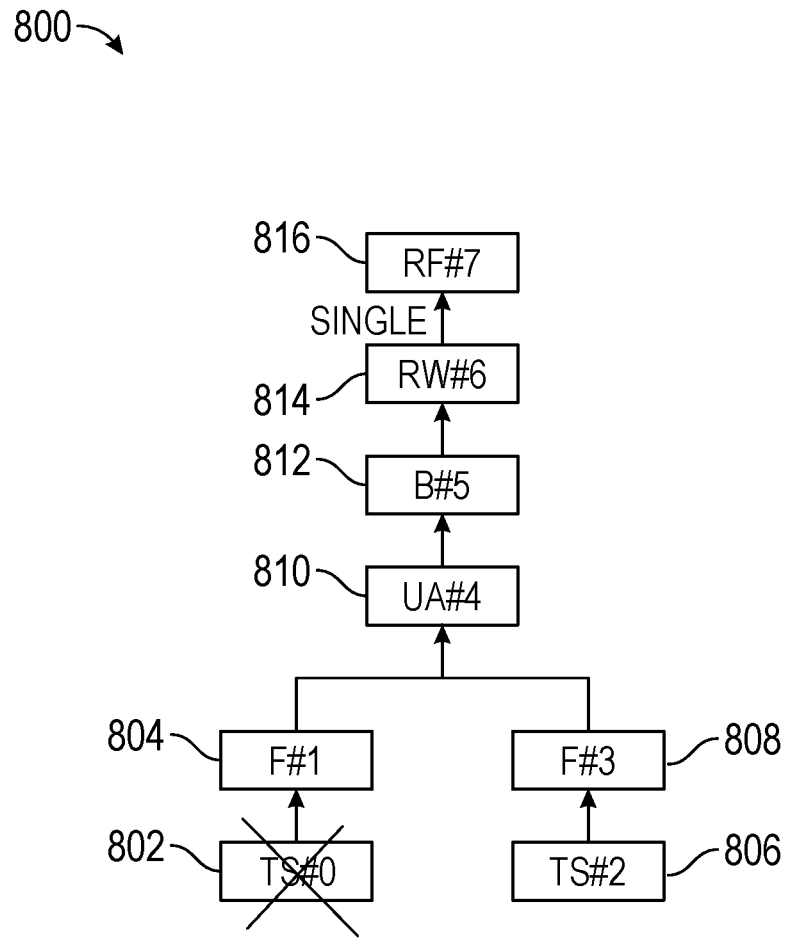
FIG. 8 shows an example query restart, in accordance with some embodiments of the present disclosure.

FIG. 8 shows an example restart of portions of a query plan 800 at operation 620, according to some example embodiments. In the query plan 800, RSO 802 (table scan, TS #0) is to be restarted due to the RSO 802 failing. In these example embodiments, RSO 804 performs a full termination in response to the restart of RSO 802. However, the RSO 806 (TS #2) is scheduled and remains active, and the process group waits until RSO 806 (TS #2) and all downstream RSOs/Links (RSOs 808, 810, 812, 814, and 816) have finished before rescheduling and restarting RSO 802 (TS #0). The incarnation of all RSOs downstream from TS #0 (e.g., RSO 804, filter F #1) is incremented, but not that of RSOs 806 and 808 (TS #2 and F #3, respectively). In this way, when the RSO 802 fails, the query plan 800 is not restarted, and only the RSO 802 and 804 RSO are restarted, which significantly decreases fixing the RSO failure (e.g., a few milliseconds for the restart, instead of hundreds of milliseconds for restarting the entire query plan 800).

Returning to FIG. 6, at operation 625, the query is completed. For example, at operation 625 the queried for data is generated and returned to the user as result data. As an additional example in which the query plan is writing or storing processed data, at operation 625 the processing is completed and the data is stored or otherwise written to the storage platform 104.

Described implementations of the subject matter can include one or more features, alone or in combination as illustrated below by way of example.

Example 1. A method comprising: generating a query plan for a query on a distributed database, the query plan comprising a plurality of database operations; identifying a plurality of contingent database operations from the plurality of database operations of the query plan, the plurality of contingent database operations configured to generate query data for the query based on being executed at a specific position in the query plan in relation to one or more other operators of the plurality of database operations; scheduling the plurality of contingent database operations for execution using a scheduler of an execution node of the distributed database without scheduling remaining database operations of the plurality of database operations that are excluded from the plurality of contingent database operations, the scheduled contingent database operations set by the scheduler to execute at the specific position in the query plan and the remaining database operations being available for execution at different times in processing of the query plan based on thread availability of the execution node; processing, using the execution node, of the distributed database, the query plan according to the scheduled contingent database operations; and storing, by the distributed database, data generated in processing the query plan.

Example 2. The method of example, wherein the plurality of contingent database operations comprises a beginning leaf operation that generates query data based on being executed at a beginning of the query plan.

Example 3. The method of any of examples 1 or 2, wherein the plurality of contingent database operations comprises an end operation that generates query data based on being executed at an end of the query plan.

Example 4. The method of any of examples 1-3, wherein the plurality of contingent database operations comprises a dependent operation that generates query data using data that is generated by completion of a previous database operation upon which the dependent operation depends.

Example 5. The method of any of examples 1-4, further comprising: listing, by the execution node, one or more pipelines as ready for processing by the execution node, a pipeline of the one or more pipelines comprising an additional plurality of database operations of the query plan; and executing the one or more pipelines while an existing pipeline that comprises the plurality of database operations is executing on the execution node.

Example 6. The method of any of examples 1-5, wherein the distributed database comprises a limit for a quantity of new pipelines that can be executed while the existing pipeline is executing on the execution node.

Example 7. The method of any of examples 1-6, wherein the one or more pipelines comprises a plurality of pipelines.

Example 8. The method of any of examples 1-7, wherein the plurality of pipelines that are executed based on being listed as ready is less than the limit of the quantity of new pipelines that can be executed while the existing pipeline is executing on the execution node.

Example 9. The method of any of examples 1-8, further comprising: restarting one or more of the plurality of database operations without restarting other database operations in the query plan.

Example 10. The method of any of examples 1-9, wherein: a restart instruction is issued by the execution node to restart one or more of the plurality of database operations; and the other database operations in the query plan complete processing based on the restart instruction.

Example 11. The method of any of examples 1-10, wherein the restart instruction is received, followed by completion of processing of the other database operations, and further followed by restarting the one or more of the plurality of database operations according to the restart instruction.

Example 12. A system comprising: one or more processors of a machine; and at least one memory storing instructions that, when executed by the one or more processors, cause the machine to perform any of the methods 1-11.

Example 13. A machine storage medium embodying instructions that, when executed by a machine, cause the machine to perform any of the methods 1-11.

Figure 9:
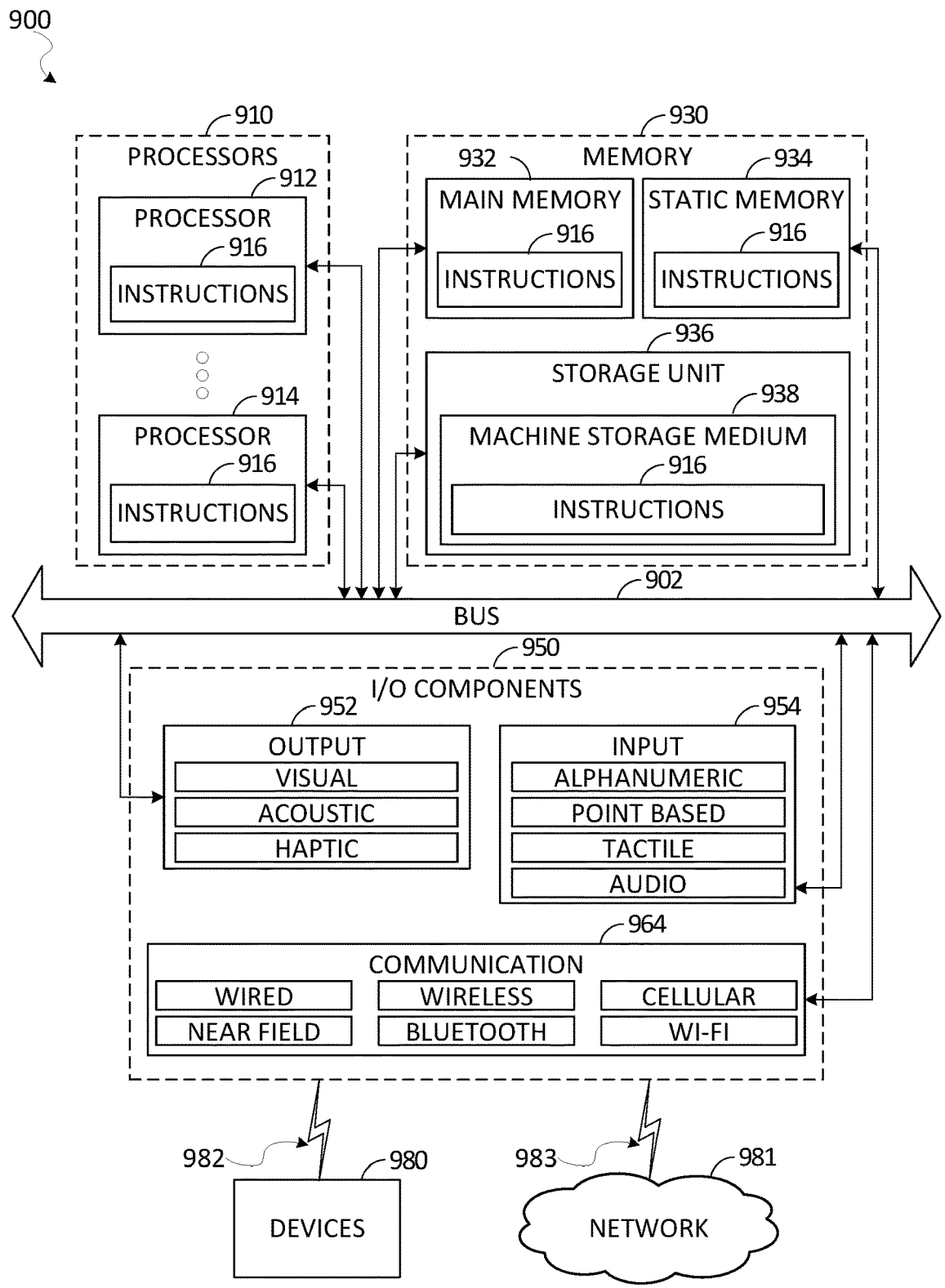
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of the method 600. As another example, the instructions 916 may cause the machine 900 to implement one or more portions of the query operations and methods of FIGS. 4, and 6-8. In this way, the instructions 916 transform a general, non-programmed machine into a particular machine 900 (e.g., the compute service manager 108 or a node in the execution platform 110) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single one of the machines 900 is illustrated, the term "machine" shall also be taken to include a collection of machines 900 that individually or jointly execute the instructions 916 to perform any one or more of the methodologies discussed herein.

The machine 900 includes multi-core processors 910, memory 930, and input/output (I/O) components 950 configured to communicate with each other such as via a bus 902. In an example embodiment, the multi-core processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multi-core processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the multi-core processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within machine storage medium 938 of the storage unit 936, within at least one of the multi-core processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 981 or devices 980 via a coupling

982 and a coupling 983, respectively. For example, the communication components 964 may include a network interface component or another suitable device to interface with the network 981. In further examples, the communication components 964 may include wired communication components, wireless communication components, cellular communication components, and other communication components to provide communication via other modalities. The devices 980 may be another machine or any of a wide variety of peripheral devices (e.g., a peripheral device coupled via a universal serial bus (USB)). For example, as noted above, the machine 900 may correspond to any one of the compute service manager 108 or the execution platform 110, and the devices 980 may include the client device 114 or any other computing device described herein as being in communication with the network-based database system 102 or the cloud storage platform 104.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 981 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 981 or a portion of the network 981 may include a wireless or cellular network, and the coupling 983 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 981 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 983 (e.g., a peer-to-peer coupling) to the devices 980. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations. In view of the disclosure above, various examples are set forth below. It should be noted that one or more features of an example, taken in isolation or combination, should be considered within the disclosure of this application.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   generating a request plan for a request on a cloud data platform, the request plan comprising a plurality of operations;
   identifying a plurality of contingent operations from the plurality of operations of the request plan;
   scheduling, by at least one hardware processor, the plurality of contingent operations for execution using a scheduler;
   setting the scheduled plurality of contingent operations to execute at a specific position in the request plan;
   setting remaining operations for execution by any available thread as threads that are processing the request plan become available; and
   processing the request plan according to the scheduled plurality of contingent operations.

2. The method of claim 1, wherein the cloud data platform includes a plurality of execution nodes on which the plurality of operations is performed, each execution node of the plurality of execution nodes includes the scheduler configured to select an operator of a plurality of operators to receive the request plan.

3. The method of claim 2, wherein the scheduler further comprises:
   synchronizing distributed execution of the plurality of operators across all worker processes; and
   finalizing the plurality of operators in a deterministic manner for correct output data.

4. The method of claim 1, further comprising:
   listing, by the scheduler, one or more pipelines as ready for processing, a pipeline of the one or more pipelines comprising an additional plurality of operations of the request plan.

5. The method of claim 4, further comprising:
   executing the one or more pipelines while an existing pipeline that comprises the plurality of operations is executing on an execution node of the cloud data platform.

6. The method of claim 4, wherein each pipeline of the one or more pipelines is a sequence of connected row set operators (RSOs), wherein each sequence of connected RSOs start and end with one or more leaf operators, end in a pipeline breaker, or end in a result operator.

7. The method of claim 1, further comprising:
   restarting one or more of the plurality of operations without restarting other operations in the request plan.

8. A system comprising:
   one or more hardware processors of a machine; and
   at least one memory storing instructions that, when executed by the one or more hardware processors, cause the system to perform operations comprising:
   generating a request plan for a request on a cloud data platform, the request plan comprising a plurality of operations;
   identifying a plurality of contingent operations from the plurality of operations of the request plan;
   scheduling, by at least one hardware processor, the plurality of contingent operations for execution using a scheduler;
   setting the scheduled plurality of contingent operations to execute at a specific position in the request plan;
   setting remaining operations for execution by any available thread as threads that are processing the request plan become available; and
   processing the request plan according to the scheduled plurality of contingent operations.

9. The system of claim 8, wherein the cloud data platform includes a plurality of execution nodes on which the plurality of operations is performed, each execution node of the plurality of execution nodes includes the scheduler configured to select an operator of a plurality of operators to receive the request plan.

10. The system of claim 9, wherein the scheduler further comprises:
    synchronizing distributed execution of the plurality of operators across all worker processes; and
    finalizing the plurality of operators in a deterministic manner for correct output data.

11. The system of claim 8, further comprising:
    listing, by the scheduler, one or more pipelines as ready for processing, a pipeline of the one or more pipelines comprising an additional plurality of operations of the request plan.

12. The system of claim 11, further comprising:
    executing the one or more pipelines while an existing pipeline that comprises the plurality of operations is executing on an execution node of the cloud data platform.

13. The system of claim 11, wherein each pipeline of the one or more pipelines is a sequence of connected row set operators (RSOs), wherein each sequence of connected RSOs start and end with one or more leaf operators, end in a pipeline breaker, or end in a result operator.

14. The system of claim 8, further comprising:
restarting one or more of the plurality of operations without restarting other operations in the request plan.

15. A machine-storage medium embodying instructions that, when executed by a machine, cause the machine to perform operations comprising:
generating a request plan for a request on a cloud data platform, the request plan comprising a plurality of operations;
identifying a plurality of contingent operations from the plurality of operations of the request plan;
scheduling, by at least one hardware processor, the plurality of contingent operations for execution using a scheduler;
setting the scheduled plurality of contingent operations to execute at a specific position in the request plan;
setting remaining operations for execution by any available thread as threads that are processing the request plan become available; and
processing the request plan according to the scheduled plurality of contingent operations.

16. The machine-storage medium of claim 15, wherein the cloud data platform includes a plurality of execution nodes on which the plurality of operations is performed, each execution node of the plurality of execution nodes includes the scheduler configured to select an operator of a plurality of operators to receive the request plan.

17. The machine-storage medium of claim 16, wherein the scheduler further comprises:
synchronizing distributed execution of the plurality of operators across all worker processes; and
finalizing the plurality of operators in a deterministic manner for correct output data.

18. The machine-storage medium of claim 15, further comprising:
listing, by the scheduler, one or more pipelines as ready for processing, a pipeline of the one or more pipelines comprising an additional plurality of operations of the request plan; and
executing the one or more pipelines while an existing pipeline that comprises the plurality of operations is executing on an execution node of the cloud data platform.

19. The machine-storage medium of claim 18, wherein each pipeline of the one or more pipelines is a sequence of connected row set operators (RSOs), wherein each sequence of connected RSOs start and end with one or more leaf operators, end in a pipeline breaker, or end in a result operator.

20. The machine-storage medium of claim 19, further comprising:
restarting one or more of the plurality of operations without restarting other operations in the request plan.

* * * * *